US012139325B2

(12) United States Patent
Morand et al.

(10) Patent No.: US 12,139,325 B2
(45) Date of Patent: Nov. 12, 2024

(54) FILM-DISPENSING CASSETTE FOR WASTE-DISPOSAL SYSTEMS

(71) Applicant: ANGELCARE CANADA INC., Montréal (CA)

(72) Inventors: Michel Morand, Verdun (CA); Hugo Moerman-Rousseau, St-Hubert (CA)

(73) Assignee: ANGELCARE CANADA INC., Montreal (CA)

(*) Notice: Subject to any disclaimer, the term of this patent is extended or adjusted under 35 U.S.C. 154(b) by 0 days.

(21) Appl. No.: 17/912,575

(22) PCT Filed: Mar. 30, 2022

(86) PCT No.: PCT/CA2022/050483

§ 371 (c)(1),
(2) Date: Sep. 19, 2022

(87) PCT Pub. No.: WO2022/204813

PCT Pub. Date: Oct. 6, 2022

(65) Prior Publication Data

US 2024/0208721 A1 Jun. 27, 2024

Related U.S. Application Data

(60) Provisional application No. 63/167,749, filed on Mar. 30, 2021.

(51) Int. Cl.
*B65F 1/06* (2006.01)

(52) U.S. Cl.
CPC ........ *B65F 1/062* (2013.01); *B65F 2240/132* (2013.01)

(58) Field of Classification Search
CPC ....... B65F 1/062; B65F 2240/132; B65F 1/06
(Continued)

(56) References Cited

U.S. PATENT DOCUMENTS 6,612,099 B2 9/2003 Stravitz
7,395,646 B2 7/2008 Salman
(Continued)

FOREIGN PATENT DOCUMENTS

EP 3575242 A1 * 12/2019 ............. B65F 1/062
WO WO-2019068237 A1 * 4/2019

OTHER PUBLICATIONS

International Search Report for corresponding application PCT/CA2022/050483 filed Mar. 30, 2022; Mail date Jun. 28, 2022.
(Continued)

*Primary Examiner* — J. Gregory Pickett
*Assistant Examiner* — Niki M Eloshway
(74) *Attorney, Agent, or Firm* — CANTOR COLBURN LLP

(57) ABSTRACT

A film-dispensing cassette having an annular cassette body having a top end and a bottom end. The annular cassette body has a central opening having a central axis. The annular cassette body defines a receptacle extending around the central opening. The receptacle has an annular opening at the top end of the annular cassette body. The receptacle has a registration wall extending along a periphery of the central opening, the registration wall having a downwardly facing surface having a relief defining a pattern of protrusions and recesses having a curved outline along the periphery of the central opening. The protrusions have respective crest lines extending obliquely relative to the central axis.

20 Claims, 9 Drawing Sheets

(58) Field of Classification Search
USPC .................................................... 220/495.07
See application file for complete search history.

(56) References Cited

U.S. PATENT DOCUMENTS

| | | | | |
|---|---|---|---|---|
| 7,757,467 | B2 | 7/2010 | Chomik | |
| 2008/0272140 | A1* | 11/2008 | Mowers | B65F 1/062 221/69 |
| 2016/0060025 | A1* | 3/2016 | Dunn | B65F 1/062 206/409 |
| 2016/0083182 | A1* | 3/2016 | Dunn | B65F 1/062 206/409 |
| 2016/0244258 | A1 | 8/2016 | Morand | |
| 2020/0180884 | A1* | 6/2020 | Dunn | B65F 1/062 |
| 2022/0388767 | A1* | 12/2022 | Dunn | B65F 1/062 |

OTHER PUBLICATIONS

Written Opinion for corresponding application PCT/CA2022/050483 filed Mar. 30, 2022; Mail date Jun. 28, 2022.

* cited by examiner

FILM-DISPENSING CASSETTE FOR WASTE-DISPOSAL SYSTEMS

CROSS-REFERENCE TO RELATED APPLICATION

The present application claims the priority of U.S. Patent Application No. 63/167,749, filed on Mar. 30, 2021, and incorporated herein by reference.

TECHNICAL FIELD

The present application pertains to film-dispensing cassettes as used in waste-disposal systems, such as those having garbage cans, pails, composts, etc.

BACKGROUND OF THE ART

Film-dispensing cassettes are commonly used for dispensing a length of flexible tubing for use within waste-disposal systems, for instance used for collecting waste. The waste may take various forms, such as human and animal waste (e.g., diapers, wipes, hygiene products, or pet waste), kitchen waste, organic waste, compostable waste, etc. In use, film-dispensing cassettes may have to be mounted onto a cassette seating portion of a pail. The film-dispensing cassettes may be compatible with cassette seating portions having different shapes. In some instances, in order to maintain alignment between the film-dispensing cassette and the seating portion, such seating portions may have features requiring a precise alignment and/or positioning of the film-dispensing cassette relative to such features for adequate mounting. This may be impractical and/or frustrating for a user of such waste-disposal systems.

SUMMARY

In accordance with a first aspect of the present disclosure, there is provided a film-dispensing cassette comprising: an annular cassette body having a top end and a bottom end, the annular cassette body having: a central opening, the central opening having a central axis, the annular cassette body defining a receptacle extending around the central opening, the receptacle having an annular opening at the top end of the annular cassette body, the receptacle having a registration wall extending along a periphery of the central opening, the registration wall having a downwardly facing surface having a relief defining a pattern of protrusions and recesses having a curved outline along the periphery of the central opening, the protrusions having respective crest lines extending obliquely relative to the central axis.

In accordance with a second aspect of the present disclosure, there is provided a film-dispensing cassette comprising: an annular cassette body having a top end and a bottom end, the annular cassette body having: a central opening having a central axis, the annular cassette body defining a receptacle extending around the central opening, the receptacle having an annular opening at the top end of the annular cassette body, the receptacle having a registration wall extending along a periphery of the central opening, the registration wall having a downwardly facing surface having a relief including an intermittent series of concavities and convexities along the periphery of the central opening, a transition between a respective one of the concavities and an adjacent one of the convexities defining an inflexion point, the convexities each having an obliquely extending crest line, a projection line of the obliquely extending crest line intersecting with the central axis.

In accordance with a third aspect of the present disclosure, there is provided a film-dispensing cassette comprising an annular cassette body having a top end and a bottom end, the annular cassette body having a central opening, the central opening having a central axis, the annular cassette body defining a receptacle extending around the central opening, the receptacle having an annular opening at the top end of the annular cassette body, the receptacle having a registration wall extending along a periphery of the central opening, the registration wall having a downwardly facing surface having a relief defining a pattern of protrusions and recesses, the protrusions having respective crest lines extending obliquely relative to the central axis, the crest lines lying in a virtual frustum, a free annular volume being delimited by the virtual frustum, a virtual cylinder projecting from the periphery of the central opening, and an axial plane at a bottom of the cassette body.

Further in accordance with any one of the above aspects, for example, a projection line of the respective crest lines intersects obliquely with the central axis.

Further in accordance with any one of the above aspects, for example, at least some of the projection lines of the respective crest lines and the central axis form an angle of 50±10 degrees.

Further in accordance with any one of the above aspects, for example, the recesses have respective valley lines extending towards the central axis, a projection line of the respective valley lines intersecting with the central axis.

Further in accordance with any one of the above aspects, for example, the projection line of the respective valley lines and the central axis form an angle of 85±15 degrees.

Further in accordance with any one of the above aspects, for example, the pattern of protrusions and recesses is symmetrical with respect to at least four axes of symmetry.

Further in accordance with any one of the above aspects, for example, the pattern of protrusions and recesses is symmetrical with respect to six axes of symmetry aligned with respective pairs of crest lines of the protrusions and six axes of symmetry aligned with respective pairs of valley lines of the recesses.

Further in accordance with any one of the above aspects, for example, the registration wall includes a series of spaced surface areas located between adjacent protrusions defined by the downwardly facing surface, the spaced surface areas defining respective arched portions the registration wall.

Further in accordance with any one of the above aspects, for example, the spaced surface areas have respective normal lines extending therefrom and forming a 90±10 degrees angle with the central axis.

Further in accordance with any one of the above aspects, for example, the spaced surface areas are each aligned with a respective one of the spaced surface areas located on an opposite side of the central opening.

Further in accordance with any one of the above aspects, for example, the receptacle has an outer wall and an inner wall, the inner wall delimiting the central opening from the top end of the body, the outer wall having a greater heightwise extent than the inner wall.

Further in accordance with any one of the above aspects, for example, a height of the outer wall is at least 2.8±0.5 times a height of the inner wall.

Further in accordance with any one of the above aspects, for example, the receptacle has an inner wall and an outer wall, a junction between the inner wall and the registration wall and a junction between the outer wall and a bottom wall extending between the registration wall and the outer wall are located at a spaced elevation along the central axis relative to each other.

Further in accordance with any one of the above aspects, for example, wherein the spaced elevation is at least 35±5% of a height of the body.

Further in accordance with any one of the above aspects, for example, the receptacle has an inner wall delimiting the central opening from the top end of the body, the inner wall extending obliquely relative to the central axis.

Further in accordance with any one of the above aspects, for example, the inner wall extends obliquely from the top end to the registration wall.

Further in accordance with any one of the above aspects, for example, the inner wall extends obliquely at an angle from 0 to 15 degrees relative to the central axis.

Further in accordance with any one of the above aspects, for example, wherein the receptacle has an inner wall delimiting the central opening from the top end, the inner wall having a radially inward surface facing towards the central opening, the radially inward surface including a series of circumferentially spaced ribs.

Further in accordance with any one of the above aspects, for example, the ribs extend along a same direction as the central axis.

Further in accordance with any one of the above aspects, for example, the ribs are the only features protruding out of the radially inward surface, the radially inward surface being otherwise smooth and uniform.

Further in accordance with any one of the above aspects, for example, the receptacle has an inner wall delimiting the central opening from the top end, wherein a junction between the inner wall and the registration wall defines an edge in the form of a rounded corner.

Further in accordance with any one of the above aspects, for example, wherein the rounded corner has a radius between ⅛ and 1/32 inches.

Further in accordance with any one of the above aspects, for example, the edge extends continuously along the entire periphery of the central opening.

Further in accordance with any one of the above aspects, for example, the edge has an outline defining a wave pattern along the periphery of the central opening.

Further in accordance with any one of the above aspects, for example, the wave pattern is a regular sinusoid.

Further in accordance with any one of the above aspects, for example, the receptacle has an outer wall extending from the top end, the outer wall tapers from the top end in an inverted frusto-conical shape.

Further in accordance with any one of the above aspects, for example, the outer wall tapers down to a junction of the outer wall with a bottom wall, at the bottom end.

Further in accordance with any one of the above aspects, for example, the receptacle has an outer wall, a bottom wall including a flat ring portion extending from the outer wall, the flat ring portion defining a ring surface extending from the outer wall.

Further in accordance with any one of the above aspects, for example, the ring surface extends between the downwardly facing surface of the registration wall and the outer wall.

Further in accordance with any one of the above aspects, for example, the ring surface lies in a plane to which a vector of the central axis is normal.

Further in accordance with any one of the above aspects, for example, the ring surface extends circumferentially along and is continuous with the downwardly facing surface.

Further in accordance with any one of the above aspects, for example, the central opening is circular.

Further in accordance with any one of the above aspects, for example, the central opening has a diameter of 4.5±0.5 inches

DETAILED DESCRIPTION

Figure 1:
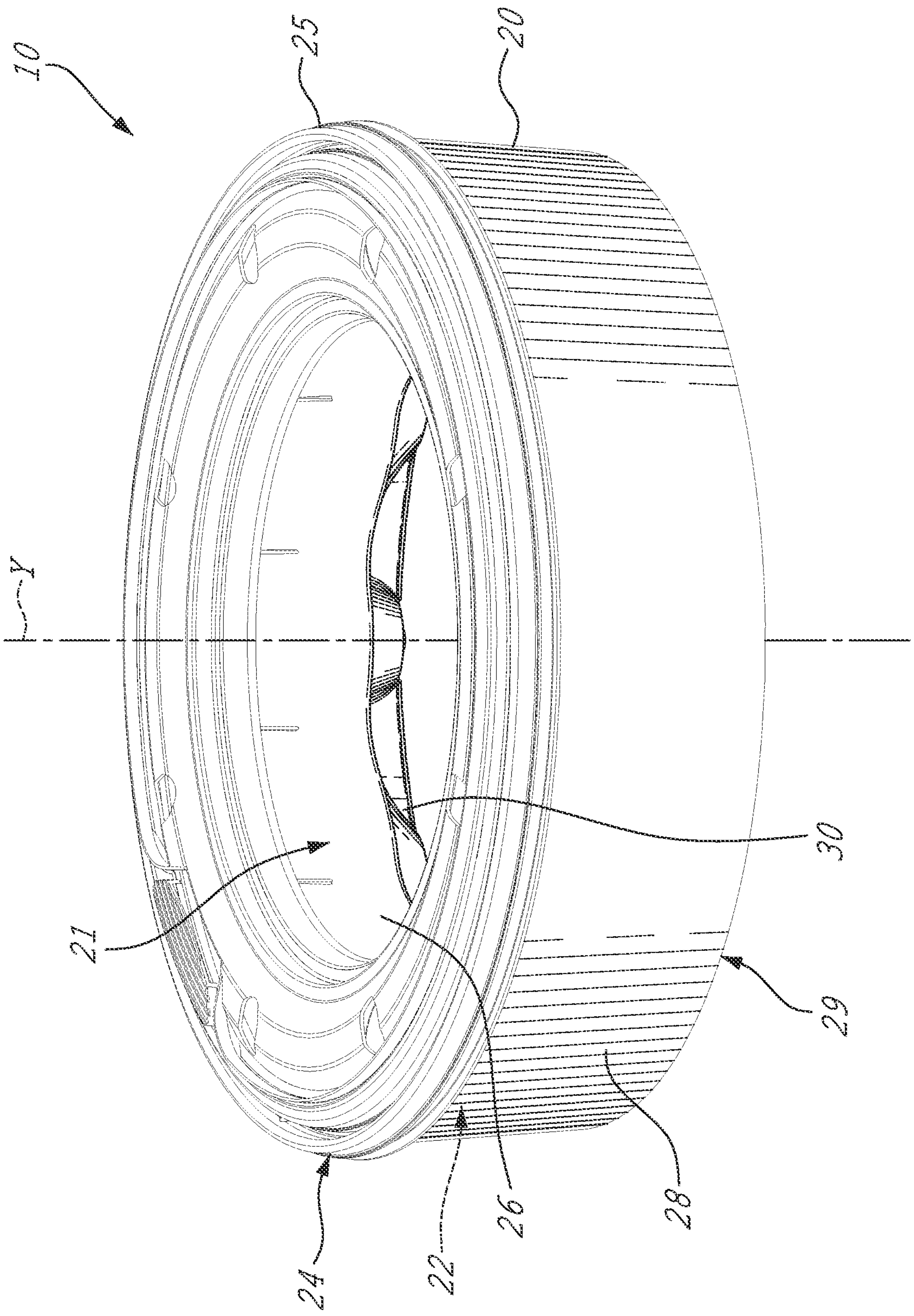
FIG. 1 is a top perspective view of a film-dispensing cassette for waste disposal systems, in accordance with a first variant.

Referring to the drawings and more particularly to FIGS. 1 to 8, a film-dispensing cassette is shown at 10, and may be for use in various types of waste disposal systems (e.g., garbage, garbage containers, diaper pail systems, litter pail systems, kitchen waste pail systems, etc). Such waste disposal systems may include a pail (e.g. diaper pail, litter pail, kitchen waste pail, etc.). The cassette 10 may be removably connected to the pail. In at least some variants, the cassette 10 may be adapted to matingly engage a cassette seating portion of a pail when properly installed therein. Examples of such systems are referred to in U.S. Pat. No. 8,899,420, the entire contents of which are hereby incorporated by reference herein.

The cassette 10 has a cassette body 20. The cassette body 20 is annular. While the exemplary cassette 10 shown in FIGS. 1 to 8 is generally cylindrical, the term annular is not to be construed as being limited to cylindrical. The cassette 10 may have other suitable shapes adapted to cooperate with a correspondingly shaped cassette seating portion of a pail. Such annular cassette body 20 may be square, pentagonal, octagonal, squircle, oval, etc. These shapes are given as examples.

Figure 2:
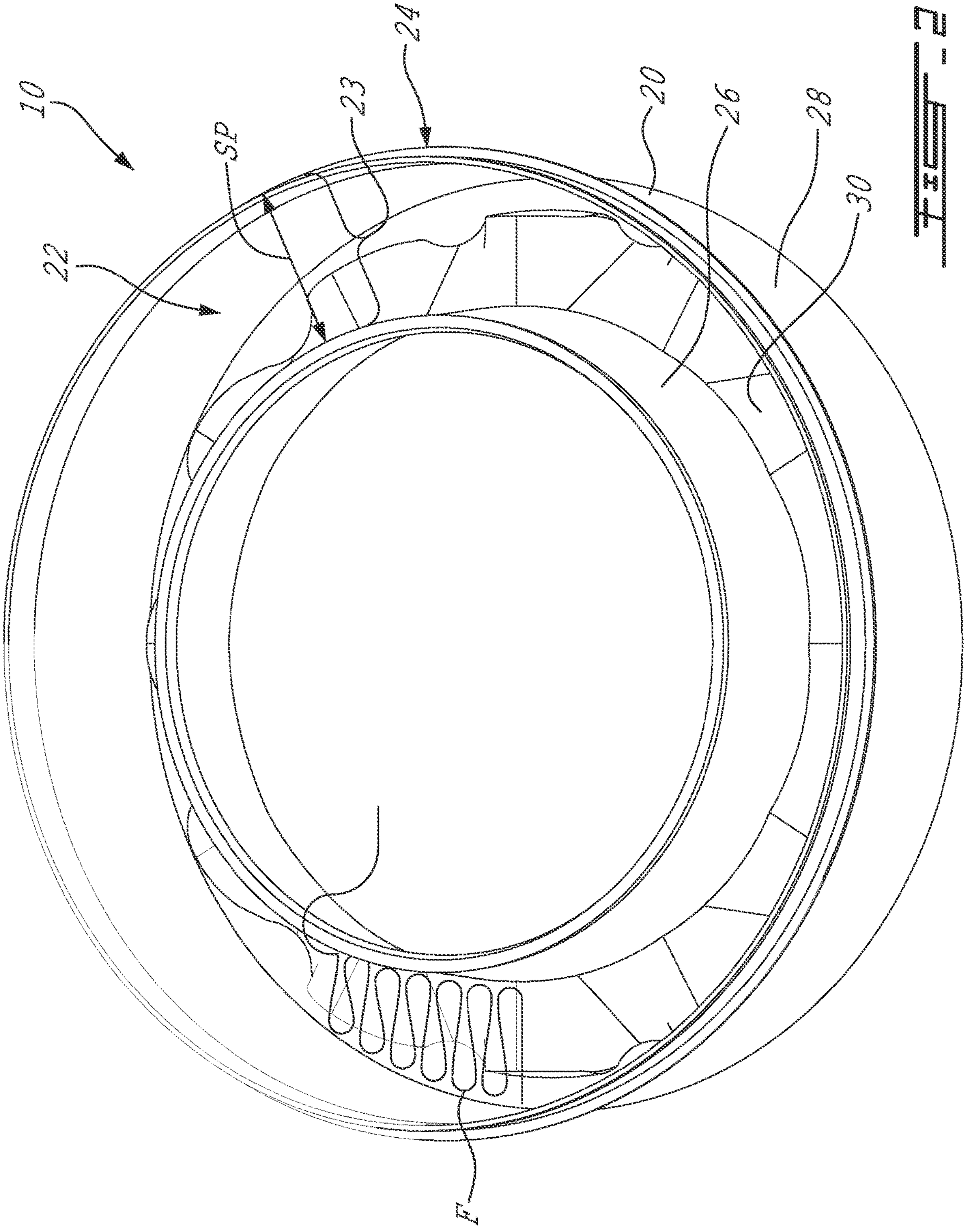
FIG. 2 is a top perspective view of the film-dispensing cassette of FIG. 1, showing an elongated tubular film stored therein.

The cassette body 20 defines a central opening 21 through which film dispensed by the cassette 10 passes, and through which a diaper or other disposable objects (e.g. waste), can pass through to be received in a closed end of the film. The central opening 21 has a central axis Y. As shown, the central axis Y is located at a geometrical center of the cassette body 20. In use, when the cassette 10 is mounted in a pail, the central opening 21 is generally aligned with an opening of such pail providing access to a waste storage volume thereof, below the cassette 10. The cassette body 20 defines an annular receptacle 22 extending circumferentially about the central opening 21. The annular receptacle 22 (or simply "receptacle 22") can store an elongated tubular film F therein, for instance in a pleated condition. As seen in FIG. 2, the receptacle 22 has an annular opening 23 at a top end 24 of the cassette body 20 to dispense a length of the film F from the receptacle 22. In use, the film F extends out of the receptacle 22 via the annular opening 23 and through the central opening 21 so as to define a tubular bag when the free end of the film F is knotted or otherwise closed. The tubular bag may then receive disposable objects through the central opening 21 of the cassette 10. The annular opening 23 may be at least partially covered via a cassette lid 25 (FIG. 1) attached to the top end 24 of the cassette body 20. The cassette lid 25 may attach to the cassette body 20 via any suitable connection arrangement, such as interlocking features cooperating with an inner wall 26 and/or outer wall 28 of the cassette body 20. The cassette lid 25 may be removed or at least partially torn off from the cassette body 20 to allow the length of film F to be removed therefrom. In a variant, the cassette lid 25 extends from the inner wall 26 to the outer wall 28 of the receptacle 22, with a portion of the lid 25 that may be torn off, for instance by having a tear-off feature for manual removal of the portion of the lid 25. In another variant, the lid 25 as a whole is removed. As a variant, a portion of the lid 25 remains connected to the inner wall of the receptacle 22, with an annular gap being radially outward of the portion of the lid 25 remaining on the cassette body 20. The reverse arrangement is possible. The cassette body 20 may also be without an outer wall.

As seen at least in FIG. 2, the receptacle 22 is defined by the inner wall 26, the outer wall 28 (if present), and, at a bottom end 29 of the cassette body 20, a registration wall 30 extending between the inner wall 26 and the outer wall 28 (if present defining an outer surface of the receptacle 22). In some embodiments, a bottom wall 34 extending between the registration wall 30 and the outer wall 28 may be present. In other cases the registration wall 30 may extend from the inner wall 26 to the outer wall 28. The inner wall 26, the outer wall 28 (if present) and the registration wall 30 define sides of the receptacle 22. In at least some embodiments, such as shown, the inner wall 26, the outer wall 28, the registration wall 30 and the bottom wall 34 extend continuously. Continuity between these walls 26, 28, 30, 34 may be obtained by molding as a single piece, welding, or other manufacturing techniques. The walls 26, 28, 30 and 34 (if present) may be made of a single material, and be in a monoblock arrangement.

Figure 3:
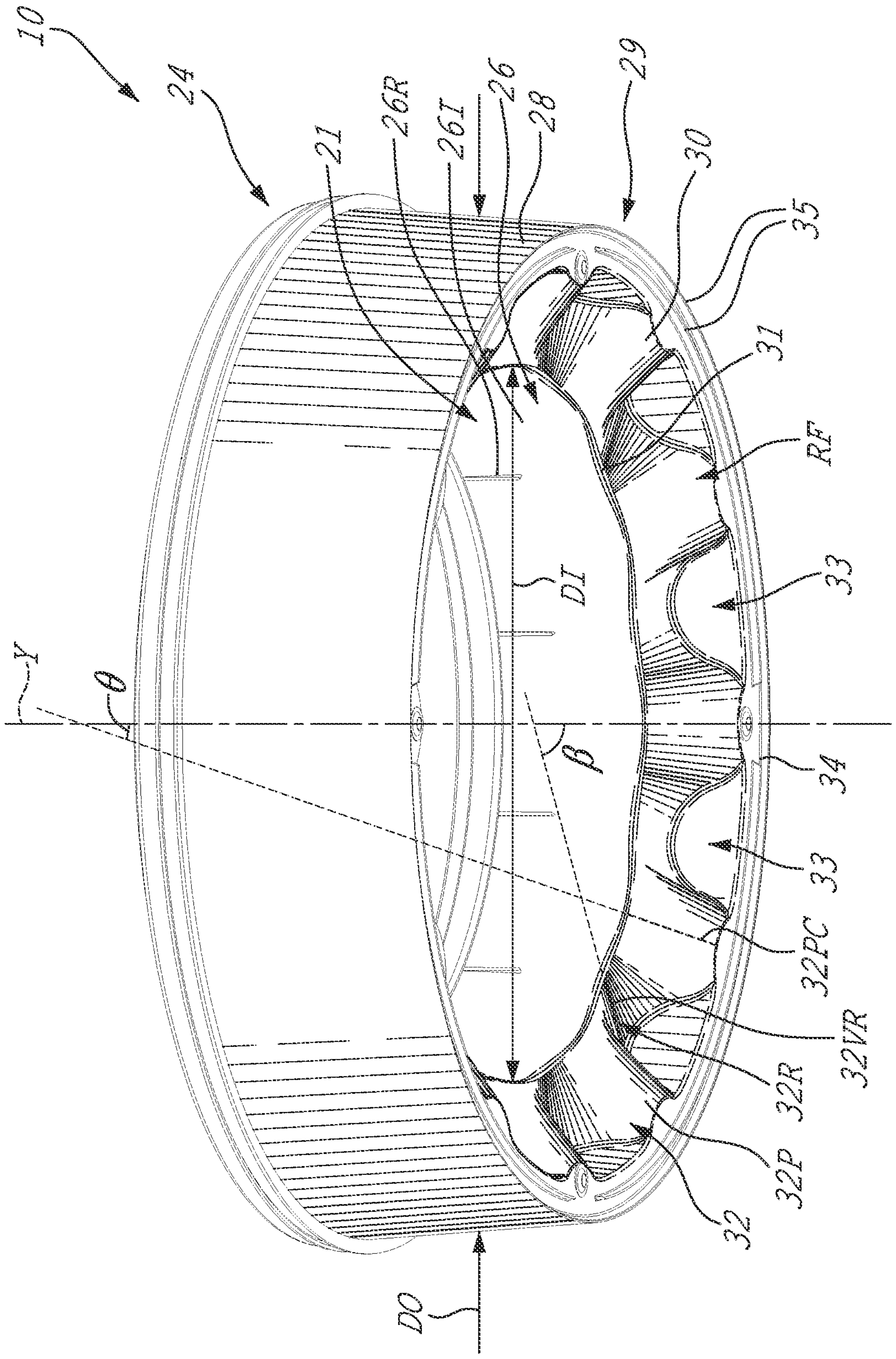
FIG. 3 is a bottom perspective view of the film-dispensing cassette of FIG. 1.
Figure 4:
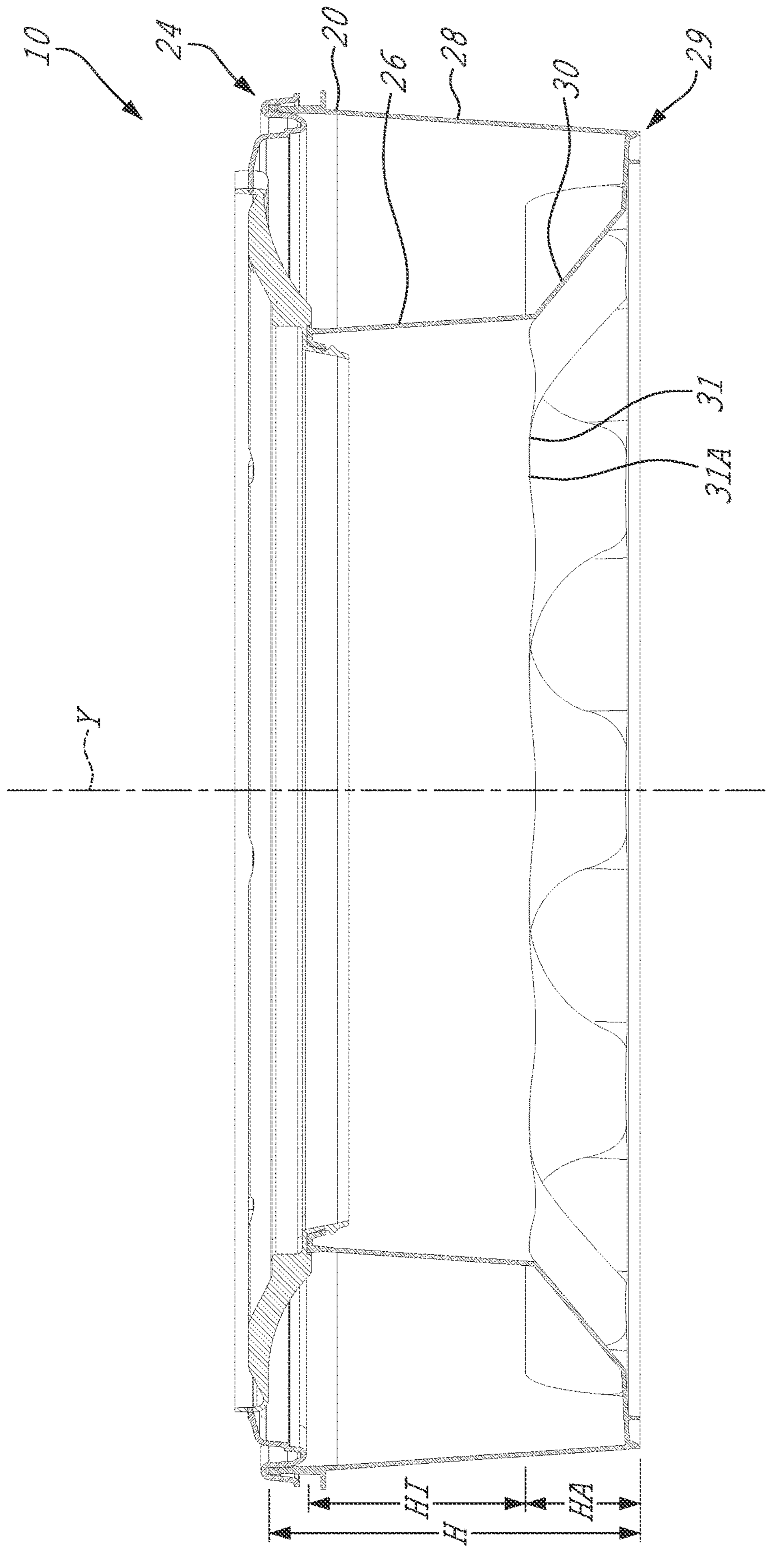
FIG. 4 is a first cross-section view of the film-dispensing cassette of FIG. 1.
Figure 5:
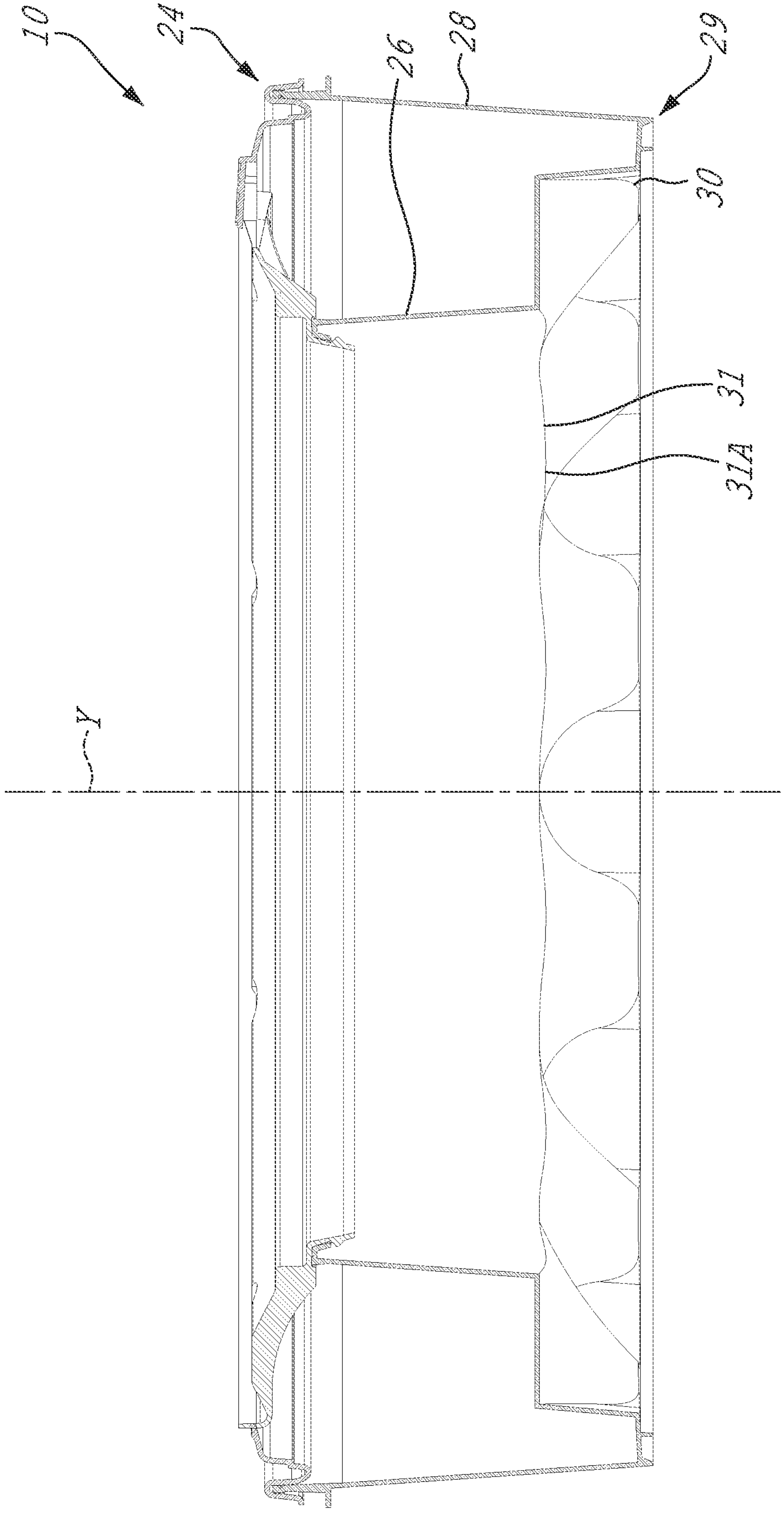
FIG. 5 is a second cross-section view of the film-dispensing cassette of FIG. 1.
Figure 6:
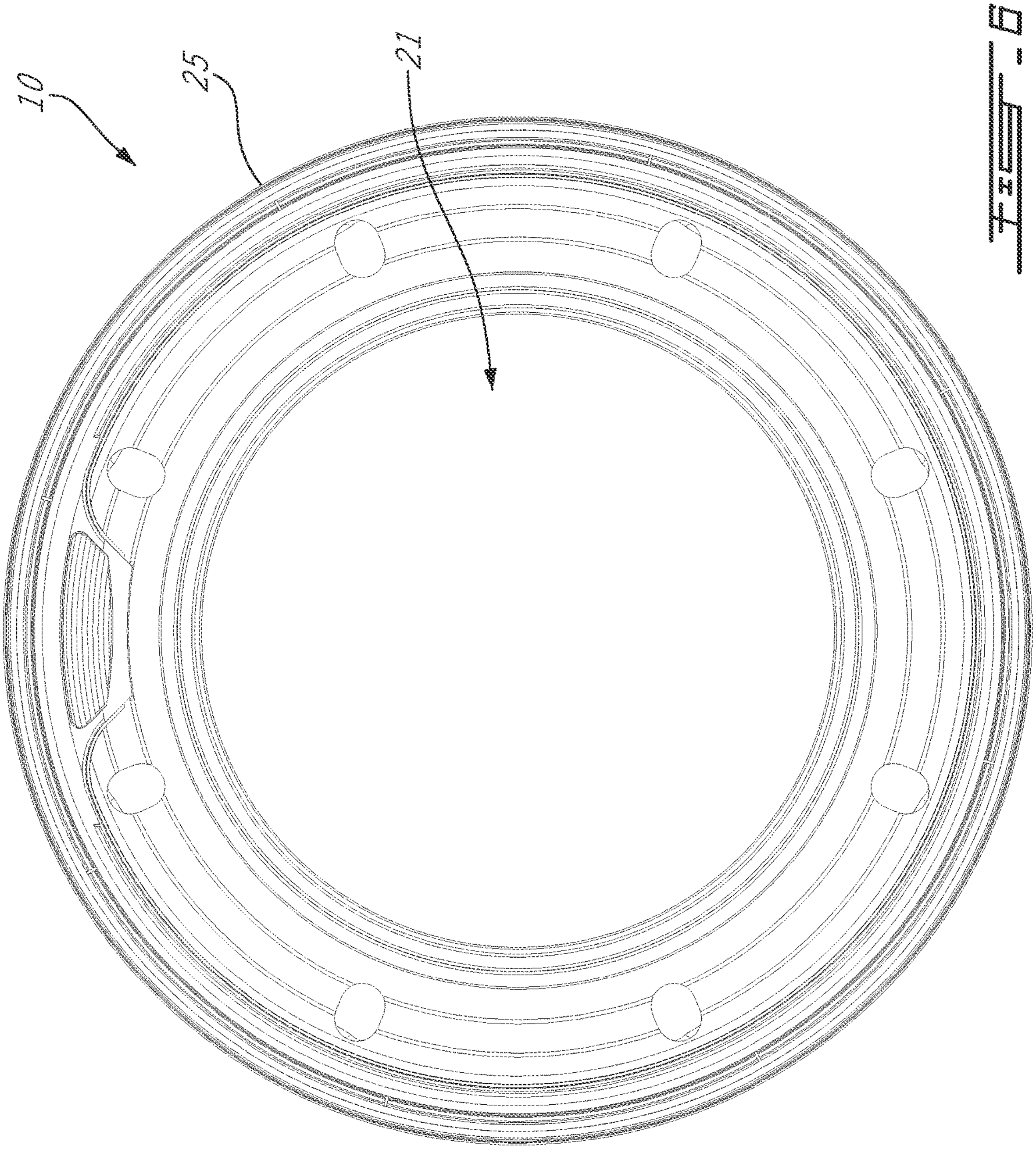
FIG. 6 is a top view of the film-dispensing cassette of FIG. 1.

In the embodiment shown, the inner wall 26 extends from the top end 24 of the cassette body 20. The central opening 21 is delimited by the inner wall 26 from the top end 24 of the cassette body 20. As shown in FIG. 3, the inner wall 26 has a radially inward surface 261 facing radially towards the central opening 21, whereby the radially inward surface 261 defines a periphery of the central opening 21. In the depicted embodiment, the radially inward surface 261 may be cylindrical or frustoconical in geometry, such that the central opening 21 is circular. The central opening 21 has a diameter DI delimited by the radially inward surface 261. In at least some embodiments, the diameter DI of the central opening 21 is 4.5±0.5 inches. The diameter DI may be measured as a mean diameter of the central opening 21 along the inner wall 26. The inner wall 26 may flare towards the registration wall 30. When viewed in a side elevation view of the cassette 10, the inner wall 26 may extend obliquely, in an embodiment from 0 to 15 degrees, relative to the central axis Y, and from the top end 24 to the registration wall 30 (FIGS. 4-5).

With continued reference to FIG. 3, the entire radially inward surface 261 is generally smooth and uniform. In the depicted embodiment, the radially inward surface 261 includes a series of circumferentially spaced ribs 26R, here extending along a same direction as the central axis Y. Such ribs 26R are optional. In the depicted embodiment, the ribs 26R are the only features protruding out of the otherwise smooth and uniform radially inward surface 261. The radially inward surface 261 may include slots, slits, or other types of openings, and/or notches or other irregularities in some variants.

If present, the outer wall 28 defines an outer periphery of the cassette body 20. The outer wall 28 extends from the top end 24 of the cassette body 20, on an opposite side of the receptacle 22 than that of the inner wall 26. A radial spacing SP between the inner wall 26 and the outer wall 28 at the top end 24 defines the annular opening 23 of the receptacle 22 (FIG. 2). In at least some embodiments, the spacing SP is 1.8±1.0 inches. Other dimensions may be contemplated in other embodiments.

When viewed in a side elevation view of the cassette 10, the outer wall 28 may taper from the top end 24, in an inverted frusto-conical shape. The tapering may extend down to a junction of the outer wall 28 with the bottom wall 34, at the bottom end 29 (FIGS. 4-5). In other embodiments, the outer wall 28 may extend generally parallel to the central axis Y, and/or parallel to the inner wall 26.

With continued reference to FIG. 3, the outer wall 28 is circular so as to provide the outer periphery of the cassette body 20 with a cylindrical or frusto-conical shape. In the depicted embodiment, the outer wall 28 defines a generally regular outer diameter DO of the cassette body 20. In at least some embodiments, the outer diameter DO is 6.3±1.5 inches. The outer diameter DO may be measured as a mean diameter along the outer wall 28. In at least some embodiments, the outer wall 28 may be shaped differently from the inner wall 26. For instance, the inner wall 26 may have a circular shape while the outer wall 28 may have a square, octagonal, or other outer peripheral shape.

The outer wall 28 extends from the top end 24 to the bottom end 29 of the cassette body 20. The outer wall 28 defines a height H (FIGS. 4-5) of the cassette body 20. In at least some embodiments, the height H is 1.5±0.8 inches. The outer wall 28 has a greater heightwise extent than the inner wall 26. In at least some embodiments, the height H of the outer wall 28 is at least 2.8±0.5 times a height HI of the inner wall 26, with the heights H, HI taken in a direction extending along the central axis Y.

In a variant, the registration wall 30 interconnects the inner wall 26 and the outer wall 28. The registration wall 30 has an elevation extent HA (FIG. 4) in the direction of the central axis Y. In some cases, HI+HA=H. A junction between the inner wall 26 and the registration wall 30, and a junction between the outer wall 28 and the registration wall 30 (or bottom wall 24 between the registration wall 30 and the outer wall 28, if wall 34 is present) are located at a spaced elevation along the central axis Y. In at least some embodiments, the elevation extent HA of the registration wall 30 is at least 35±5% of the height H of the cassette body 20. Although the expression "registration wall 30" is used in the singular, it can be observed that the registration wall 30 may have various segments, portions, etc. For example, the bottom wall 34 may form a portion of the registration wall 30 in some cases. In a variant, the registration wall 30 may be described as spanning from a bottom edge of the inner wall 26 to a bottom edge of the outer wall 28.

The dimensions SP, DI, DO, H, HI and HA referred to herein may vary to respect the geometrical proportions contemplated herein in other embodiments. Yet, in other embodiments, such geometrical proportions may be different to accommodate the cassette 10 to other types of waste disposal systems, for instance.

With continued reference to FIG. 3, the junction between the inner wall 26 and the registration wall 30 defines an edge 31. The edge 31 may be a sharp corner or a rounded corner. For instance, the edge 31 in the form of a rounded corner may have a radius between ⅛ and 1/32 inches. The embodiments where the edge 31 is a sharp corner may have a radius smaller than 1/32 inches, for instance. In the depicted embodiment, the edge 31 extends continuously along the entire periphery of the central opening 21, and may be circular for example. In other embodiments, the edge 31 may be discontinuous. For instance, the inner wall 26 and/or the registration wall 30 may include one or more slots (or other types of openings) intersecting with the edge 31.

In the depicted embodiment, the edge 31 is not straight along the periphery of the central opening 21, when viewed in a side elevation view of the cassette. As can be seen at FIGS. 4-5, the edge 31 may have an outline 31A that defines a slight wave pattern along the periphery of the central opening 21. In at least some embodiments, such wave pattern is a regular sinusoid. Irregular sinusoid may also be contemplated, or the outline 31A may have other wave patterns in other variants. The outline 31A may be plainly circular as well. The elevation extent HA of the registration wall 30 may be measured as a median elevation extent along the periphery of the central opening 21 from the bottom end 29 to the edge 31.

The junction between the inner wall 26 and the registration wall 30 may lie in a single elevation plane (as shown) such as by being circular, or not straight (e.g. wave, tooth, step, or other patterns, either regular or irregular) along the periphery of the central opening 21.

Figure 9A:
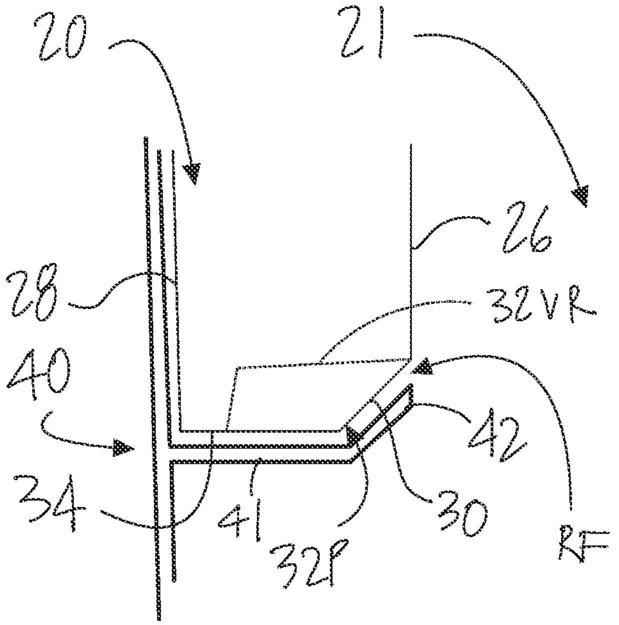
FIG. 9A is a schematic representation of a section of the film-dispensing cassette of FIG. 1, received on an exemplary cassette seating portion of a pail.
Figure 9B:
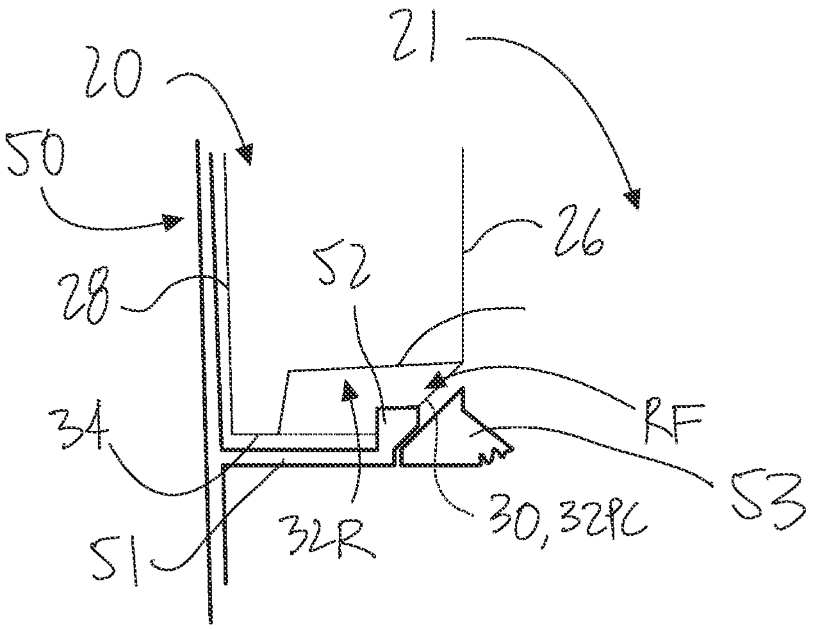
FIG. 9B is a schematic representation of a section of the film-dispensing cassette of FIG. 1, received on another exemplary cassette seating portion of a pail.

The registration wall 30 has registration features RF compatible with a correspondingly shaped geometry of the cassette seating portion of the pail in which it is intended to be used, or defining clearances in which pail features can be lodged. FIGS. 9A and 9B referred to below give examples thereof. The registration features RF are adapted to limit a circumferential shift of the cassette body 20 when matingly engaged in the seating portion of such pail and/or to allow installation of the cassette body 20 in the pail in spite of seating portion features. As such, the cassette body 20 may be circumferentially secured (or circumferentially "locked") in place in the seating portion. In at least some embodiments, the shape of the registration features RF allows substantially no circumferential shift between the cassette body 20 and the seating portion of the pail with corresponding shape. In some embodiments, the shape of the registration features RF along the periphery of the central opening 21 corresponds to a negative of the shape of the seating portion of the pail and contacts such seating portion along the periphery of the central opening 21. This may allow a more secured fit, better alignment, and/or sturdy mating engagement of the cassette 10 within the pail. The registration features RF may also limit side shift with respect to the cassette seating portion. In other words, concentric alignment of the cassette body 20 and the cassette seating portion may be maintain or at least promoted. The registration features RF may also prevent the user from inserting the cassette body 20 upside down, for example as described below with respect to FIG. 9A.

Moreover, the registration features RF may otherwise accommodate non-complementarily shaped features in a seating portion of a pail, such that the registration features RF may give the cassette 10 compatibility with other types of pails. This may contribute to a reduction of product lines required in retail due to the extended compatibility of the cassette 10 with the configuration described herein.

The registration features RF according the embodiment shown will now be further described with reference to FIGS. 3 and 7. In a variant, the registration features RF may include a regular pattern of features extending along part of or along the entire periphery of the central opening 21. As such, the cassette body 20 may be matingly engaged with the correspondingly shaped cassette seating portion of the pail with which it is intended to be used, in a plurality of relative circumferential positions. In an embodiment, for instance, the registration features RF may allow mating engagement with the correspondingly shaped cassette seating portion in at least four relative circumferential positions. In a particular embodiment, the registration features RF allow mating engagement with the correspondingly shaped cassette seating portion in twelve relative circumferential positions. Such a high number of different possible circumferential positions may allow a more convenient and/or user friendly mounting of the cassette body 20 with the cassette seating portion of the pail. Whether or not the cassette seating portion is correspondingly shaped, or the cassette body 20 in mating engagement with such a shaped cassette seating portion, the registration features RF may allow installation of the cassette body 20 in a plurality of relative circumferential positions with respect to features of the cassette seating portion, for example with projections as in FIG. 9B, described below.

In the depicted embodiment, the registration features RF are defined by a downwardly facing surface 32 of the registration wall 30, relative to an orientation of installation. As shown, the surface 32 has a relief including an intermittent series of concavities and convexities along the periphery of the central opening 21. A transition between one such concavity and an adjacent convexity defines an inflexion point. The surface 32 defines a pattern of protrusions 32P and recesses 32R, where the protrusions 32P transition into and are spaced apart from one to another by the recesses 32R. The pattern of protrusions 32P and recesses 32R may be referred to as a wave pattern, as the protrusions 32P and recesses 32R have a curved outline along the periphery of the central opening 21. Stated differently, a circular sectional line having a center lying on central axis Y, at any radius between the edge 31 and a radially outward edge (inclusively or not), would have a wave pattern when laid onto a flat surface. The wave pattern could also be regarded as a sinusoidal pattern.

Referring to FIG. 3, the protrusions 32P have respective crest lines 32PC extending from the edge 31 towards the bottom end 29 of the cassette. The crest lines 32PC extend obliquely towards the central axis Y. In the depicted embodiment, a projection line of the respective crest lines 32PC intersects obliquely with the central axis Y. In an embodiment, the projection line of the respective crest lines 32PC and the central axis Y form an angle θ of 50±10 degrees. In other embodiments, the angle θ may be different and/or not all of the crest lines 32PC may form the same angle θ with respect to the central axis Y-Y. The recesses 32R have respective valley lines 32VR. As shown, the valley lines 32VR extend towards the central axis Y-Y. In an embodiment, such as shown, the projection line of the respective valley lines 32VR intersect with the central axis Y. In an embodiment, the projection line of the respective valley lines 32VR and the central axis Y form an angle ß of 85±15 degrees. In other embodiments, the angle β may be different and/or not all of the valley lines 32VR may form the same angle ß with respect to the central axis Y.

Figure 7:
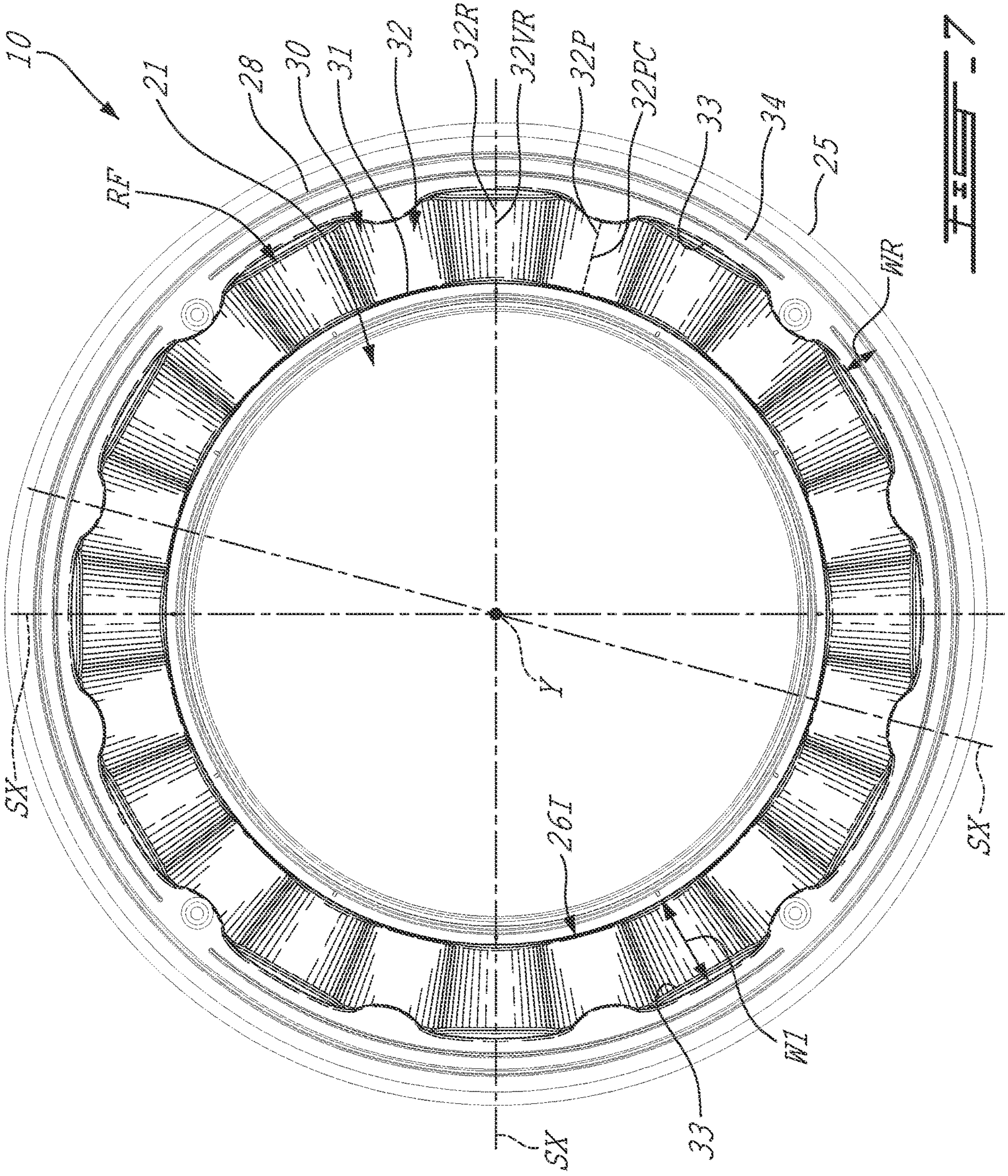
FIG. 7 is a bottom view of the film-dispensing cassette of FIG. 1.
Figure 8:
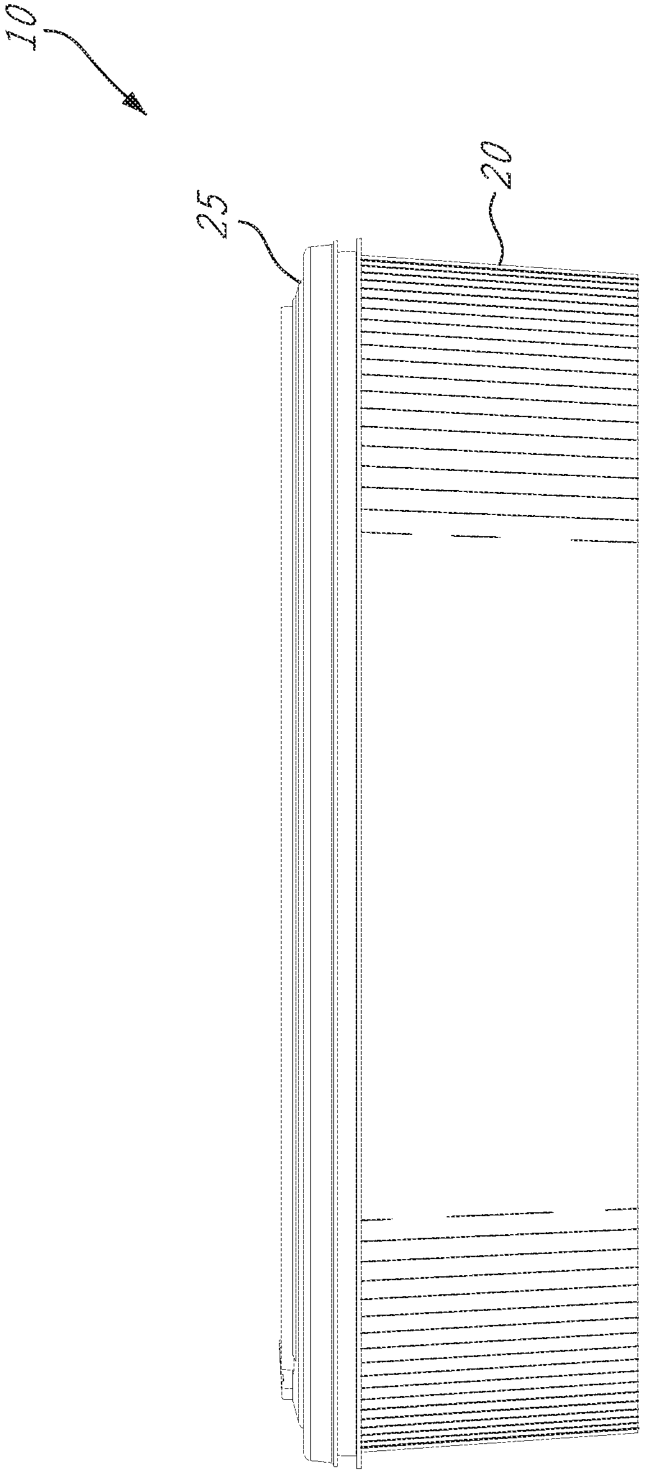
FIG. 8 is a side view of the film-dispensing cassette of FIG. 1.

When viewed from the bottom of the cassette 10, as shown in FIG. 7, the pattern of protrusions 32P and recesses 32R may be symmetrical with respect to at least four axes of symmetry SX in some embodiments, two of which are shown. As such, in at least some variants, the cassette 10 may matingly engage with a seating portion of a pail in at least four circumferentially offset relative positions. In the depicted embodiment, the pattern of protrusions 32P and recesses 32R is symmetrical with respect to six axes of symmetry SX aligned with respective pairs of the crest lines 32PC of the protrusions 32P and six axes of symmetry SX aligned with respective pairs of the valley lines 32VR of the recesses 32R. As such, the cassette 10 of the depicted embodiment may matingly engage with a seating portion of a pail in twelve circumferentially offset relative positions. The pattern of protrusions 32P and recesses 32R may be symmetrical with respect to more or less axes of symmetry in other embodiments, such as six, eight, ten, fourteen, for example. However, in an embodiment, there are one, two, three or four recesses 32R only.

As shown, the registration wall 30 includes a series of spaced surface areas 33 located between adjacent protrusions 32P defined by the surface 32. Such surface areas 33 define respective arched portions (best seen in FIG. 3) of the registration wall 30. The surface areas 33 are disposed circumferentially about the central opening 21. In the depicted embodiment, the surface areas 33 are parallel (±3 degrees) to the inner wall 26, or concentric with the inner wall 26. The surface areas 33 have respective normal lines extending therefrom and forming a 90±10 degrees angle with the central axis Y. In other embodiments, the surface areas 33 may be angled relative to the inner wall 26 in other embodiments. The surface areas may be flat or may be cylindrical segments, among other shapes.

In at least some embodiments, a mean distance W1 between the radially inward surface 261 of the inner wall 26 and a respective one of the surface areas 33 (see FIG. 7) is 1.0±0.5 inches. Such distance W1 may be identical when taken with respect to each one of the surface areas 33, though this is only one possibility. As shown in FIG. 7, the surface areas 33 are each aligned with a respective one of the surface areas 33 located on an opposite side of the central opening 21. This may be different in other embodiments, such as, for instance, where there is an odd number of protrusions 32P/recesses 32R, and/or where the protrusions 32P/recesses 32R are unevenly distributed or shaped along the periphery of the central opening 21.

Returning to FIG. 3 and with additional reference to FIG. 7, the bottom wall 34 may include a flat ring portion extending radially inwardly from the outer wall 28, though the flat ring portion may be optional. This flat ring portion may define a ring surface (i.e., annular wall or annular wall portion 34) extending from the outer wall 28. The junction between the outer wall 28 and the registration wall 30 is defined by the outer wall 28 and the ring surface. The ring surface extends between the surface 32 of the registration wall 30 (discussed above) and the outer wall 28. The ring surface may be construed as being a separate wall from the registration wall 30, as one possible interpretation. The registration wall 30 may directly connect to the outer wall 28, with the surface 32 forming at least part of the junction between the outer wall 28 and the registration wall 30 in other embodiments. The ring surface 34 extends circumferentially along and is continuous with the surface 32 and the surface areas 33. The ring surface 34 may be planar, in that it may lie in a plane. It may also be frusto-conical, wavy, etc. In an embodiment, such connection is continuous, though slots or other opening may define discontinuities at the junction between the ring surface 34 and the surface 32 and/or surface areas 33. The ring surface 34 may see ribs, knobs, projecting therefrom though this is optional in at least some embodiments, with rims 35 projecting downwardly from the surface 34. In an embodiment, the ring surface 34 has a width WR, or "radial dimension", as applicable for round cassette embodiments, having a minimum dimension equating to (DO–DI–2*W1)/2 and a maximum dimension equating to (DO–DI–2*W1)/2. In an embodiment, such width WR corresponds to ¼±¹⁄₁₆ inches. Other dimensions may be contemplated in other embodiments. The ring surface 34 may lie in a plane to which a vector of the central axis Y is normal, though this is optional.

Referring to FIGS. 9A and 9B, a section of the cassette body 20 is shown schematically, for instance with some components removed, such as the film F, lid 25, etc., to simplify the figures. Moreover, only a section of the cassette body 20 is shown, with background lines removed, again to simplify the figures. However, the cassette body 20 may be similar to the cassette body 20 shown in the previous figures.

In FIG. 9A, the cassette body 20 is shown as being used with a pail 40 that has a support 41, which may be referred to as a cassette seating portion, as used hereinabove. The support 41 has a frustoconical portion 42 that is received in the registration feature RF, in a similar fashion to what is shown in U.S. Pat. No. 7,931,150. The frustoconical portion 42 in the pail 40 is provided to prevent the user from inserting the cassette body 20 upside down. It can be observed that the registration wall 30 defines a free annular volume in which the frustoconical portion 42, or equivalent projecting feature, may position itself. FIG. 9A may show an exaggerated spacing between the registration wall 30 of the cassette body 20 and the support 41, to illustrate clearly the complementarity between the shapes. The free annular volume may have the shape of a virtual chamfer, or may have other shapes. The free annular volume is located radially outwardly of a downward projection of the inner wall 26 or from other virtual cylinder centered about axis Y and including a smallest diameter of the cassette body 20, and upwardly of an axial projection of the ring surface 34 (or axial plane relative to axis Y and having a vector of axis Y normal to such axial plane at a bottom of the cassette body 20), and is bound by the surface 32 of the registration wall 30. In an embodiment, the free annular volume is bound by the protrusions 32P of the surface 32. In an embodiment, the protrusions 32P all lie in a common virtual frustum, which may also be referred to as a chamfer, though other shapes may be contemplated. In an embodiment, the free annular volume is delimited by the virtual frustum, a virtual cylinder projecting from the periphery of the central opening 21, and an axial plane at a bottom of the cassette body 20. In an embodiment, the frustum is aligned coaxially with the central opening 21, and has its central axis coincident with the central axis Y.

Referring to FIG. 9B, the same cassette body 20 is shown, but with another type of pail, shown as 50, and at a different section. The pail 50 has a support 51, which may also be referred to as a cassette seating portion, as used hereinabove, with one or more projecting features 52. The pail 50 may further include a rotating diaphragm 53 which rotates relative to the support 51. The rotating diaphragm 53 may be used to maintain the cassette film shut, by twisting it closed. The rotating diaphragm 53 may or may not have a frustoconical portion (as shown, present) which enters the free annular volume of the cassette body 20. The projecting feature(s) 52 is (are) present to prevent or limit rotation of the cassette body 20 when seated or otherwise received in the support 51. Accordingly, the projecting feature(s) 52 is(are) received in registration features RF, and more particularly in the recesses 32R. The surface 32 may thus come into contact with the projecting feature(s) 52 when an attempt is made to rotate the cassette 10 relative to the support 51. The projecting feature(s) 52 therefore blocks the rotation of the cassette body 20 in the pail 50. A height of the recesses 32R may be defined as a function of the height of the projecting feature(s) 52. There may be the same number of recesses 32R as there are projecting feature(s) 52, but there may be more recesses 32R than projecting features 52. Moreover, the projecting feature(s) 52 may have other shapes than what is shown in FIG. 9B.

Accordingly, the afore-described shape of the registration wall 30 of the cassette body 20 renders same usable with pails of the variety 40 shown in FIG. 9A, and pails of the variety 50 shown in FIG. 9B. The shape of the registration wall 30 makes the cassette body 20 universal for these two types of pails, and for other types of pails, such as some without the frustoconical portion 42. While the expression "registration wall 30" is used herein, wall 30 may be more generally described as wall 30, joining wall 30, oblique wall 30, wavy wall 30, notably if the cassette 10 is not horizontal during use.

The cassette 10 or cassette body 20 may be described as having two or more levels of registration features RF, with each level of registration feature RF being associated with a particular pail, such as the pail 40 of FIG. 9A for one level of registration feature RF, and the pail 50 of FIG. 9B for another level of registration feature RF. In a variant, a first level of registration features RF is defined by the crest lines 32PC lying in the frustum, as discussed above, and defining the free annular volume as described above, that can be a frustum or that may have another shape. The second level of registration features RF may be the wavy shape of the registration wall 30, with the recesses 32R enabling penetration of some of the pail projections. Both the first and second levels of registration features RF may be required for the cassette 10/cassette body 20 to be used with a given type of pail, such as the pail 50.

The cassette 10 may be described as being a film-dispensing cassette that may include one or more of an annular cassette body having a top end and a bottom end, the annular cassette body having a central opening, the central opening having a central axis, the annular cassette body defining a receptacle extending around the central opening, the receptacle having an annular opening at the top end of the annular cassette body, the receptacle having a registration wall extending along a periphery of the central opening, the registration wall having a downwardly facing surface having a relief defining a pattern of protrusions and recesses, the protrusions having respective crest lines extending obliquely relative to the central axis, the crest lines lying in a virtual frustum, a free annular volume being delimited by the virtual frustum, a virtual cylinder (e.g., centered on the central axis Y) projecting from the periphery of the central opening, and an axial plane at a bottom of the cassette body.

While the term pail is used throughout of the present disclosure, other terms such as containers, receptacles, bin, or the like can be used without departing from the broad aspects of the present disclosure.

The invention claimed is:

1. A film-dispensing cassette comprising an annular cassette body having a top end and a bottom end, the annular cassette body having a central opening, the central opening having a central axis, the annular cassette body defining a receptacle extending around the central opening, the receptacle having an annular opening at the top end of the annular cassette body, the receptacle having a registration wall extending along a periphery of the central opening, the registration wall having a downwardly facing surface having a relief defining a pattern of protrusions and recesses, the protrusions having respective crest lines extending obliquely relative to the central axis, the crest lines lying in a virtual frustum, a free annular volume being delimited by the virtual frustum, a virtual cylinder projecting from the periphery of the central opening, and an axial plane at a bottom of the cassette body.

2. The film-dispensing cassette as defined in claim 1, wherein a projection line of the respective crest lines intersects obliquely with the central axis.

3. The film-dispensing cassette as defined in claim 2, wherein at least some of the projection lines of the respective crest lines and the central axis form an angle of 50±10 degrees.

4. The film-dispensing cassette as defined in claim 1, wherein the recesses have respective valley lines extending towards the central axis, a projection line of the respective valley lines intersecting with the central axis.

5. The film-dispensing cassette as defined in claim 4, wherein the projection line of the respective valley lines and the central axis form an angle of 85±15 degrees.

6. The film-dispensing cassette as defined in claim 1, wherein the pattern of protrusions and recesses is symmetrical with respect to at least four axes of symmetry.

7. The film-dispensing cassette as defined in claim 6, wherein the pattern of protrusions and recesses is symmetrical with respect to six axes of symmetry aligned with respective pairs of crest lines of the protrusions and six axes of symmetry aligned with respective pairs of valley lines of the recesses.

8. The film-dispensing cassette as defined in claim 1, wherein the registration wall includes a series of spaced surface areas located between adjacent protrusions defined by the downwardly facing surface, the spaced surface areas defining respective arched portions the registration wall.

9. The film-dispensing cassette as defined in claim 8, wherein the spaced surface areas have respective normal lines extending therefrom and forming a 90±10 degrees angle with the central axis.

10. The film-dispensing cassette as defined in claim 1, wherein the spaced surface areas are each aligned with a respective one of the spaced surface areas located on an opposite side of the central opening.

11. The film-dispensing cassette as defined in claim 1, wherein the receptacle has an outer wall and an inner wall, the inner wall delimiting the central opening from the top end of the body, the outer wall having a greater heightwise extent than the inner wall.

12. The film-dispensing cassette as defined in claim 1, wherein the receptacle has an inner wall and an outer wall, a junction between the inner wall and the registration wall and a junction between the outer wall and a bottom wall extending between the registration wall and the outer wall are located at a spaced elevation along the central axis relative to each other.

13. The film-dispensing cassette as defined in claim 1, wherein the receptacle has an inner wall delimiting the central opening from the top end of the body, the inner wall extending obliquely relative to the central axis.

14. The film-dispensing cassette as defined in claim 13, wherein the inner wall extends obliquely from the top end to the registration wall.

15. The film-dispensing cassette as defined in claim 14, wherein the edge has an outline defining a wave pattern along the periphery of the central opening.

16. The film-dispensing cassette as defined in claim 15, wherein the wave pattern is a regular sinusoid.

17. The film-dispensing cassette as defined in claim 13, wherein the inner wall extends obliquely at an angle from 0 to 15 degrees relative to the central axis.

18. The film-dispensing cassette as defined in claim 1, wherein the receptacle has an inner wall delimiting the central opening from the top end, wherein a junction between the inner wall and the registration wall defines an edge in the form of a rounded corner.

19. The film-dispensing cassette as defined in claim 18, wherein the edge extends continuously along the entire periphery of the central opening.

20. The film-dispensing cassette as defined in claim 1, wherein the receptacle has an outer wall, a bottom wall including a flat ring portion extending from the outer wall, the flat ring portion defining a ring surface extending from the outer wall.

* * * * *